United States Patent Office 3,161,621
Patented Dec. 15, 1964

3,161,621
WATER SOLUBLE FILMS OF VINYL ALCOHOL-VINYLALKYL ETHER-VINYL ACETATE COPOLYMERS
Gordon J. Arquette, New Providence, N.J., and Sidney Ariemma, Fishkill, N.Y., assignors to Air Reduction Company, Incorporated, New York, N.Y., a corporation of New York
No Drawing. Filed Apr. 19, 1961, Ser. No. 103,965
3 Claims. (Cl. 260—85.7)

This invention relates to new and useful water soluble film materials. It more particularly relates to vinyl alcohol-vinyl ether interpolymers which form clear, colorless and flexible films. These films are water soluble over a wide temperature range.

Water soluble films and wrappers have been widely used for packaging soaps, detergents, bleaches and a variety of other materials. Any substance wrapped in a package made of these films may be dissolved or dispersed in water by simply depositing the entire package therein. The wrapper will dissolve completely, releasing the packaged material.

Novel and improved film materials have now been found which are rapidly water soluble over a wide temperature range. These films also have improved physical characteristics which will readily lend them to economic commercial exploitation. They are clear and colorless, flexible and possess high tensile and tear strength, and have vastly improved heat sealing properties.

It is thus an object of this invention to provide water soluble film materials characterized by high tensile strength.

It is a further object of this invention to provide clear, colorless and odorless water soluble films which have good heat sealing characteristics and are particularly useful in the packaging and related arts.

It is a still further object of this invention to provide films which are rapidly water soluble, in the absence of agitation, over a wide temperature range.

The objects of this invention are conveniently accomplished by polymerizing vinyl acetate and a vinyl ether under proper reaction conditions and in the presence of a polymerization initiating catalyst. The resulting interpolymer of vinyl acetate-vinyl alkyl ether is alcoholized, converting at least a portion of the acetate radicals thereof to alcohol radicals. The resulting polymeric material is washed and dissolved in solvent. Films are cast from the solution by conventional means, usually by pouring the solution onto glass or some other smooth surface and evaporating the solvent. Films also may be formed by extrusion techniques.

The vinyl ethers which are operable in this invention are low molecular weight alkyl ether with the alkyl group containing from 1 to 4 carbon atoms. Also substituted alkyl ethers which contain halides or hydroxy groups such as vinyl chloroethyl ether and vinyl hydroxy ethyl ether may be employed. Suitable vinyl ethers are vinyl methyl ether, vinyl ethyl ether, the vinyl propyl ethers and the vinyl butyl ethers. The most superior film products are obtained when using vinyl alkyl ethers in which the alkyl group contains from 1 to 3 carbon atoms. Also mixtures of various vinyl ethers may be employed.

In the production of the novel polymers of this invention, any free radical initiating catalyst may be used. Specifically preferred catalysts are $\alpha,\alpha'$-azodi-iso-butyronitrile or ammonium persulfate.

Alcoholating agents, such as the methoxide or methylate salts of sodium or potassium, or sodium or potassium hydroxide, may be used in alcoholizing the vinyl acetate-vinyl ether polymer to a polymer principally composed of vinyl alcohol and vinyl ether; however, the final polymer may contain some vinyl acetate, the amount of vinyl acetate will depend upon the degree alcoholysis, and it is preferred to alcoholize to such a degree that at least about 80% of the acetate groups are converted to hydroxyl groups. The alcoholizing agent is preferably added to the polymer in the form of a methanol solution.

In preparing the interpolymer of the present invention from about 99 to 55 mole percent vinyl acetate and from about 1 to 45 mole percent of the vinyl ether may be employed. In preparing cold water soluble films having good low temperature flexibility and good strengths it is preferred to employ from about 1 to 15 mole percent of the vinyl ether. The preferred final interpolymers, that is, the products after alcoholysis, contain from about 1 to 15 mole percent vinyl ether and may contain up to about 20% vinyl acetate with the remainder being vinyl alcohol.

The following examples will further illustrate the nature of this invention.

Example I

Vinyl acetate was purified by drying over anhydrous magnesium sulfate and then by two consecutive distillations employing a 60-plate reflux column packed with Helipaks.

100 ml. of the vinyl acetate were added to each of five heavy wall glass tubes, together with 0.1 g. of $\alpha,\alpha'$-azodi-iso-butyronitrile.

In the first glass tube, 5 ml. of vinyl methyl ether was placed; into the second, 15 ml.; into the third, 25 ml.; the fourth, 50 ml.; and fifth, 100 ml. The mixtures were cooled to a liquid nitrogen temperature, the tubes evacuated to $10^{-4}$ mm. pressure, sealed and placed in a bomb reactor at a pressure of 100 p.s.i. The bomb reactor was agitated and maintained at 55° C. for the entire 16 hours reaction period. The products were then removed by breaking the tubes and washing with acetone. Solvent and residual monomers were removed by drying in a vacuum oven for 16 hours at 40° C. and 0.1 mm. pressure.

The vinyl acetate-vinyl methyl ether copolymer samples from each tube were then separately dried. One part of each of the mixtures thereof was added to 10.6 parts of methanol. After solution was complete, 0.05 part of NaOH dissolved in 1 part methanol, was added with stirring. The reaction was allowed to continue for 12 hours at room temperature during which time, in each reaction vessel, a white fluffy precipitate formed. Following neutralization with acetic acid and separation by filtration, the precipitates were washed three times with methanol. The copolymers were dried in a vacuum oven for 16 hours at 40° C. and 0.1 mm. pressure.

Films were prepared for testing by casting water solutions of the copolymers on mercury and slowly evaporating the solvent at room temperature. Final drying was carried out by reducing the pressure to 0.1 mm. for 12 hours in a vacuum oven. All the films were clear, colorless and flexible.

Example II

Emulsion polymerization is equally efficacious in producing the film of this invention.

An aqueous solution was prepared as follows and introduced into a stainless steel autoclave. The solution contained 1000 ml. of distilled, deionized water, 20 g. sodium lauryl sulfate, 4.4 g. $Na_2CO_3$, 2.4 g. $NaHCO_3$, and 10 g. ammonium persulfate.

Vinyl acetate and methyl vinyl ether were purified as described in Example I. 100 g. of methyl vinyl ether and 900 g. vinyl acetate were then added to the aqueous solution. The reaction vessel was flushed with nitrogen, closed, heated to 60° C. and held at that temperature and at a pressure of 10 p.s.i. for about 4 hours. The reaction was slightly exothermic.

The autoclave was allowed to cool slowly to room temperature, vented and then opened. The water solution was drained off, leaving a bulky gummy mass, which was then dissolved in 7000 g. of methanol. This solution was distilled to remove the monomers, including vinyl acetate.

The solution was cooled to 60° C. 40 g. of sodium methylate dissolved in 150 cc. of methanol, was added to the copolymer solution. The solution became turbid and a precipitate formed within 2 minutes. The temperature of the solution was maintained at 60° C., refluxed and stirred for two hours in order to insure complete alcoholysis. After stirring, the solution was cooled and filtered. The cake thus obtained, weighing 345 g. was then washed with methanol and dried.

An assay of the films cast from this cake, showed that it consisted of 89.7% by weight, of vinyl alcohol, 6.2% by weight of vinyl methyl ether and the remainder vinyl acetate.

In addition to bulk and emulsion copolymerization, solution polymerization is also effective in yielding substantial quantities of the polymeric films of this invention.

Example III

The following solution was introduced into a one liter autoclave: 31 g. vinyl methyl ether; 358 g. vinyl acetate; 96 g. methanol; and 0.360 g. $\alpha,\alpha'$-azodi-iso-butyronitrile. The vessel was sealed, heated to 60° C. and held at that temperature for three hours. The pressure within the vessel was about 30 p.s.i. and the reaction was exothermic.

After a three hour reaction period, the autoclave was cooled to room temperature, opened and the batch removed. Unreacted monomers were stripped off by adding methanol and distilling. Methanol forms an azeotrope with vinyl acetate. The batch thus obtained contained 270 g. of polymer.

Saponification was accomplished by adding 17 g. of sodium methoxide and following the procedures described in Example II, in order to obtain a polymer cake, weighing 146 g. Films were cast therefrom in the conventional manner. They contained, by weight, 93.1% vinyl alcohol, 3.2% vinyl methyl ether, and the remainder vinyl acetate. The intrinsic viscosity of the films measured at 25° C., in water, was 0.28 cm.$^3$/g.

Example IV

The following was combined in a one liter flask: 15 g. vinyl isopropyl ether; 285 g. vinyl acetate; 0.28 g. azobisisobutyronitrile; and 60 g. methanol. This mixture was heated to reflux at 59° C., stirred and maintained at reflux for 5 hours. The flask was swept with a slow current of nitrogen during the reaction.

A short-stop of 0.5 g. phenyl $\beta$-naphthylamine was then added and the mixture subjected to fractional distillation to remove unreacted monomers. Methanol was also added during distillation, either as the liquid or vapor, in order to maintain the volume and dilute the polymer. The resulting clear solution contained 7.4% solids. 800 g. of the solution was transferred to a two liter resin bottle, the solution heated to 60° C. and a sodium methoxide solution, composed of 1.9 g. of sodium methoxide in 100 ml. methanol, was added. Precipitation is almost immediate. The suspension was stirred and heated under reflux for 4 hours. After neutralization with acetic acid, the precipitate was filtered, washed with methanol and dried.

Films of the polymer are prepared in the manner described above. The films of this example were rapidly soluble in cold water and were readily heat sealed.

Interpolymers were also prepared by varying the amounts of vinyl isopropyl ether and vinyl acetate used in the initial reaction mixture to 30 g., 45 g., 75 g., and 150 g. of vinyl isopropyl ether and 270 g., 255 g., 225 g., and 150 g. of vinyl acetate. The procedure for each of these quantities was the same as described above, except that when 75 g. and 150 g. of the ether were used, representing approximately 25% and 50% by weight of ether charged, the mixture, after alcoholysis was poured into 1 liter of acetone before filtering; and the final resin mixtures thereof were washed with a 1:1 mixture of methanol and acetone.

Example V 75 g. of vinyl n-butyl ether (VBE) and 925 g. of vinyl acetate were charged into a resin kettle equipped with stirrer, reflux condenser, gas inlet tube, and dropping funnel. 200 g. methanol were then added and the mixture heated to a light reflux. At this point, 50 g. of a 5% solution of $\alpha,\alpha'$-azodi-iso-butyronitrile was added to the mixture. Polymerization was continued until 30% conversion was reached after which 3 g. of styrene were added to stop polymerization. The excess monomer was stripped off and replaced by methanol. The final concentration of polymer in methanol was 20% by weight.

This solution was added dropwise and with agitation to a mixture of 2000 g. methanol and 25 g. of a concentrated sodium hydroxide solution. Saponification was completed after ½ hour after which the polymer was collected on a Büchner funnel, washed with methanol, and dried in vacuo at 50° C. The product had an intrinsic viscosity in water of 0.55.

Example VI

The same procedure as Example V was followed, exceypt 30 g. of vinyl n-butyl ether and 970 g. of vinyl acetate were employed and the polymerization was continued until 53% conversion was reached. The product had an intrinsic viscosity in water of 0.76.

Example VII

The same procedure as Example V was followed, except 120 g. of vinyl n-butyl ether and 880 g. of vinyl acetate were employed, and the polymerization was continued until 37% conversion was reached. The product had an intrinsic viscosity in water of 0.77.

Example VIII

The same procedure as Example V was followed, except 100 g. of vinyl ethyl ether and 900 g. of vinyl acetate were employed and the polymerization was continued until 20% conversion was reached. The product had an intrinsic viscosity of 0.61.

Example IX

The same procedure as Example V was followed, except 200 g. vinyl chloroethyl ether and 800 g. of vinyl acetate were employed, and the polymerization was continued until 35% conversion was reached. The product had an intrinsic viscosity in water of 0.41.

The vinyl alcohol-vinyl ether interpolymers produced according to the present invention may be formed into films which possess outstanding properties. These films are water soluble at fairly low temperatures and yet the films possess adequate physical properties such as flexibility, tensile strength and elongation. The films may be formed such as by casting an aqueous solution of the interpolymer on a glass and allowing the cast films to dry, by casting an aqueous solution onto a polished metal surface and drying in an oven, or the films may be formed by extruding. It is apparent that the various properties of the films will vary depending upon the amount of vinyl ether monomer employed in the interpolymer. It has been found where the films of the present invention are to be employed to form water soluble packages, such as for use in packaging detergents, bleaches, etc., that from about 1 to 15 mole percent of vinyl ether should be charged. If amounts in excess of about 15 mole percent are charged, the physical properties of the films drop off.

In the table below are shown some of the physical properties for films of various vinyl ether-vinyl alcohol interpolymers. The interpolymers were made according to the present invention by first polymerizing the vinyl acetate-vinyl ether using the solution polymerization technique with methanol as the solvent, such as taught in Examples III through IX above. The vinyl acetate-vinyl ether interpolymers were then alcoholized in the fashion described in the examples and the vinyl alcohol-vinyl ether interpolymers were obtained. In preparing the films a 10% aqueous solution of the interpolymer was cast on a glass plate and the film was allowed to dry at room temperature. In the first column of the table, the vinyl ether is noted. In column 2 is given the weight percent of vinyl ether which was charged, the remainder of the charge is vinyl acetate. Column 3 gives the intrinsic viscosity which was measured in water.

The water solubility of the interpolymers was obtained in the following manner. A 2" x 2" specimen which was approximately 1 mil thick was prepared. This specimen was placed in a bath filled with 1 liter of water. The bath contained an agitator which was operating at 200 r./min. and the temperature of the bath was regulated at the temperature indicated in column 6. The time required to disintegrate the specimen measured in seconds was determined and is indicated in column 4. Disintegration is determined to have taken place when the specimen breaks up to small pieces. Column 5 indicates the time in seconds before the specimen is completely dissolved. Columns 7, 8 and 9 give physical properties of films which have been conditioned at 80 to 85% relative humidity for 48 hours.

Variations and modifications of the invention will be apparent to one skilled in the art in view of the foregoing disclosure, and it is intended to include within the invention all such modifications and variations except as do not come within the scope of the appended claims.

We claim:

1. A water-soluble film comprising an interpolymer of vinyl alcohol, a vinyl alkyl ether, and 0 to 20 mol percent of vinyl acetate, said vinyl alkyl ether being present in said interpolymer in the amount of from 1 to about 15 mol percent and the alkyl radical of said ether containing from one to four carbon atoms.

2. A water-soluble film consisting essentially of an interpolymer of vinyl alcohol, a vinyl alkyl ether, and 0 to 20 mol percent of vinyl acetate, said vinyl alkyl ether being present in said interpolymer in the amount of from 1 to about 15 mol percent and said vinyl alkyl ether being selected from the group consisting of vinyl methyl ether, vinyl ethyl ether, vinyl n-propyl ether, vinyl isopropyl ether, vinyl n-butyl ether, vinyl isobutyl ether, and vinyl t-butyl ether.

3. A water-soluble film comprising (a) an interpolymer of vinyl alcohol, a vinyl alkyl ether, and 0 to 20 mol percent of vinyl acetate, said vinyl alkyl ether being present in said interpolymer in the amount of from 1 to about 15 mol percent and the alkyl radical of said ether containing from one to four carbon atoms, and (b) a plasticizer for said interpolymer.

TABLE

| 1 | 2 | 3 | 4 | 5 | 6 | 80-85% R.H. | | |
|---|---|---|---|---|---|---|---|---|
| Vinyl Ether Monomer | Wt. percent charge | η (water) | Disintegration | Dissolution | Temperature, ° C. | Tensile Strength | Elongation | 100% Modulus |
| Vinyl Isopropyl Ether | 3.0 | 2.0 | 75 | 300+ | 24 | 4,110 | 305 | 2,090 |
| | 5.0 | 0.62 | 145 | 300+ | 27 | 3,970 | 260 | 2,195 |
| | 7.5 | 0.75 | 75 | 300 | 29 | 4,345 | 320 | 1,955 |
| | 9.0 | 0.66 | 63 | 300 | 29 | 3,660 | 400 | 1,550 |
| | 12.0 | 0.32 | 29 | 49 | 27 | 1,290 | 565 | 630 |
| | 15.0 | 0.60 | 30 | 60 | 27 | 1,465 | 435 | 380 |
| Vinyl Methyl Ether | 3.0 | 0.23 | 150 | 300 | 29 | 3,830 | 290 | 2,375 |
| | 5.0 | 0.40 | 160 | 300 | 29 | 3,340 | 280 | 2,175 |
| | 9.0 | 0.58 | 90 | 300 | 28 | 3,070 | 275 | 1,745 |
| | 12.0 | 0.63 | 15 | 50 | 28 | 3,840 | 425 | 1,360 |
| | 15.0 | 0.59 | 20 | 50 | 28 | 2,365 | 425 | 855 |
| Vinyl n-Butyl Ether | 3 | 0.76 | 45 | 180 | 22 | 4,025 | 435 | 1,075 |
| | 5 | 0.73 | 35 | 120 | 22 | 3,990 | 495 | 930 |
| | 6 | 0.73 | 80 | 540 | 22 | 4,255 | 465 | 1,560 |
| | 7.5 | 0.55 | 30 | 120 | 22 | 4,265 | 490 | 1,080 |
| | 9 | 0.65 | 35 | 320 | 22 | 4,200 | 450 | 1,260 |
| | 12 | 0.77 | No dissolution | | 22 | 2,440 | 370 | 1,025 |
| | 25 | 0.31 | No dissolution | | 22 | 700 | 365 | 445 |
| Vinyl Ethyl Ether | 10 | 0.61 | 35 | 90 | 22 | 3,960 | 395 | 1,445 |
| Vinyl Chloroethyl Ether | 20 | 0.41 | 3 | 80 | 22 | 4,755 | 605 | 1,250 |

While films made from polymers containing both vinyl alcohol and vinyl ether groups have good physical properties as shown in the above table, these films may be further improved by incorporating a plasticizing agent into the interpolymer prior to the formation of the film. The plasticizer may be added to the casting or extruding solution just prior to either casting or extrusion. Various well-known polymer plasticizers such as hexylene glycol, diethylene glycol and amines, e.g. triethanolamine may be employed.

References Cited in the file of this patent

UNITED STATES PATENTS

| 1,897,856 | Noller | Feb. 14, 1933 |
| 2,016,490 | Fikentscher | Oct. 8, 1935 |

FOREIGN PATENTS

| 833,147 | Great Britain | Apr. 21, 1960 |